Dec. 4, 1934.  C. R. HARDING  1,983,171
CONVERTIBLE AIRCRAFT
Filed Aug. 8, 1932   2 Sheets-Sheet 1
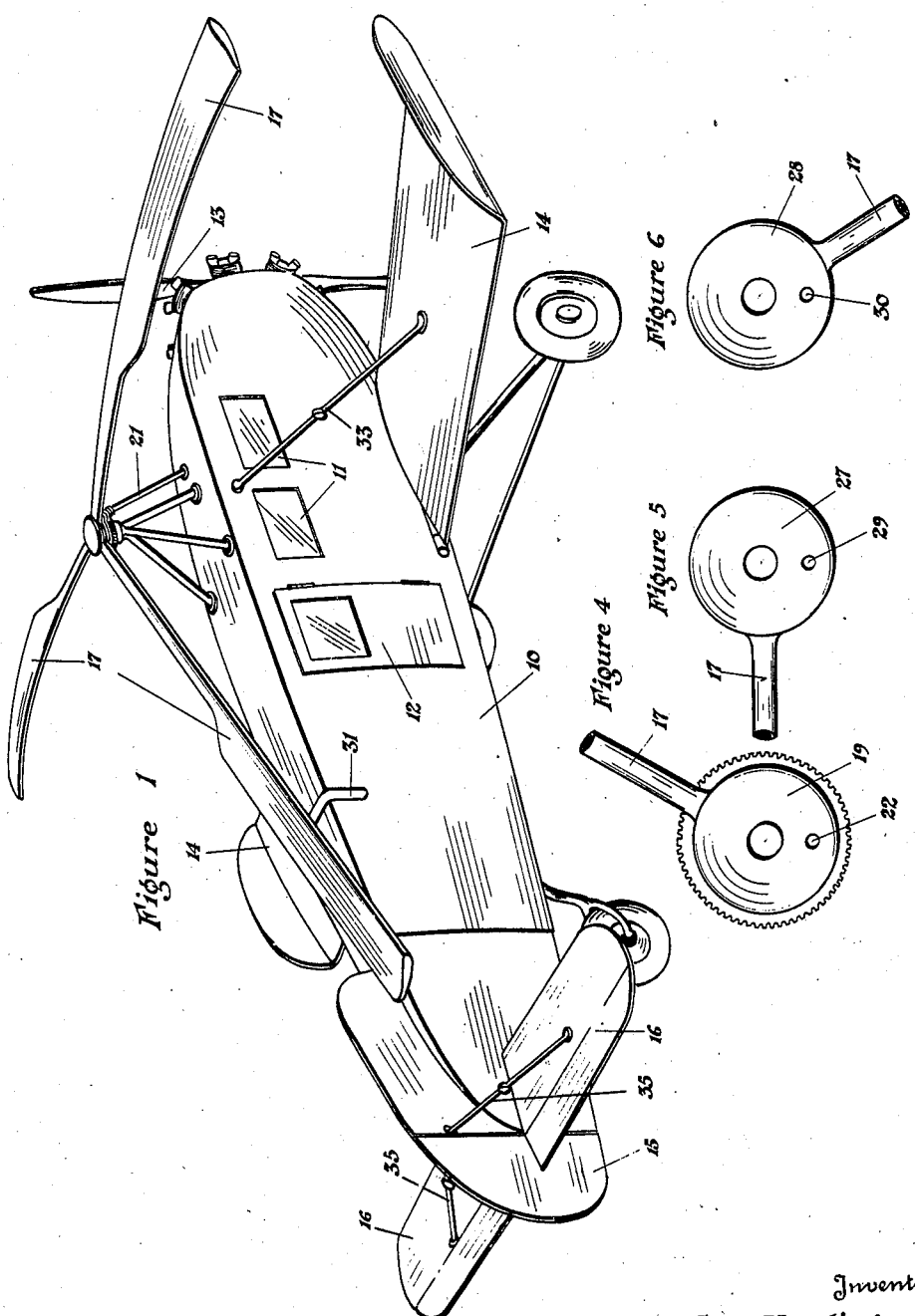
Inventor
C. R. Harding
By Emil F. Lange
Attorney Dec. 4, 1934.　　　C. R. HARDING　　　1,983,171
CONVERTIBLE AIRCRAFT
Filed Aug. 8, 1932　　　2 Sheets-Sheet 2
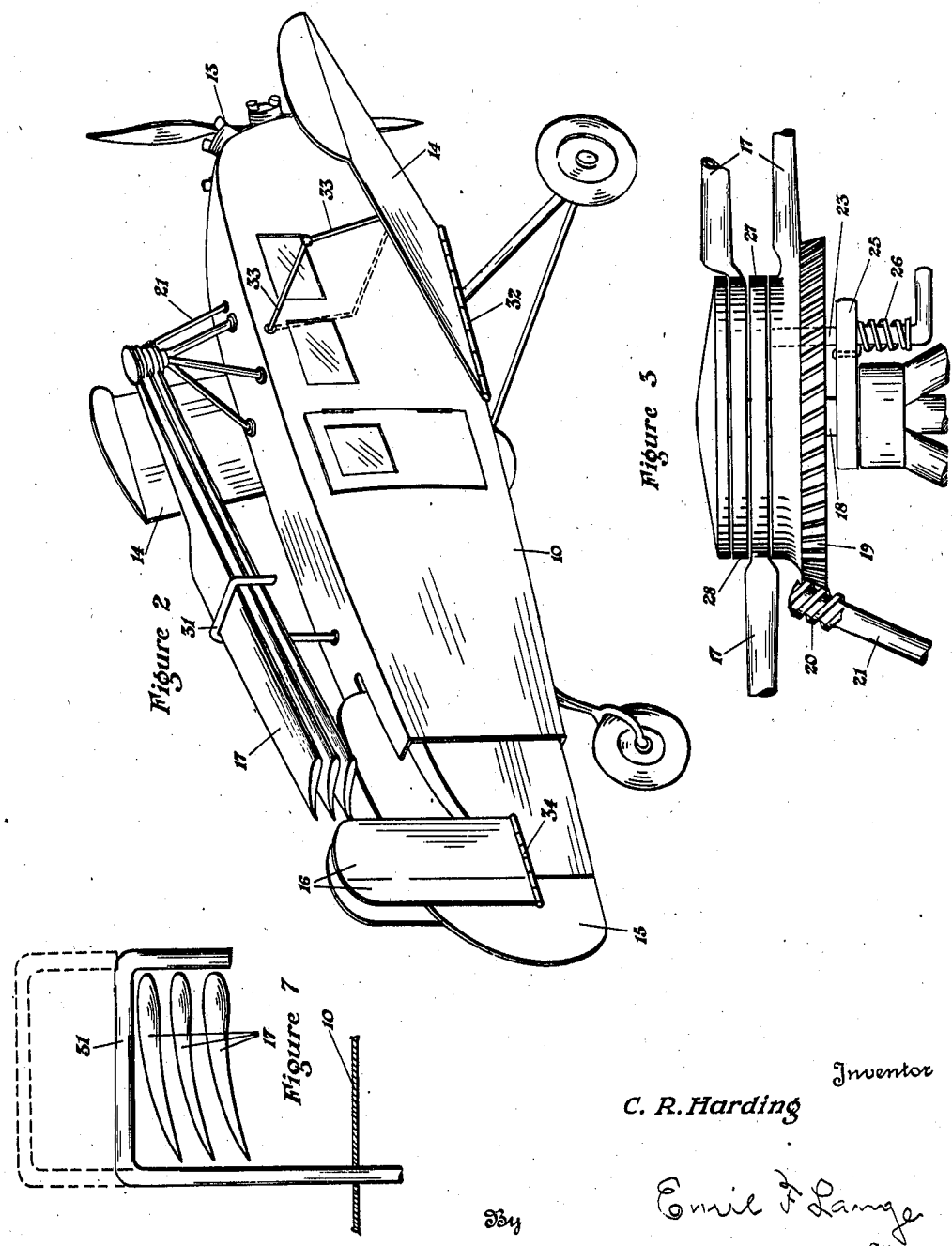
Inventor
C. R. Harding
By Emil F. Lange
Attorney Patented Dec. 4, 1934

1,983,171

UNITED STATES PATENT OFFICE 1,983,171

CONVERTIBLE AIRCRAFT

Clyde R. Harding, Council Bluffs, Iowa

Application August 8, 1932, Serial No. 627,949

4 Claims. (Cl. 244—30)

My invention relates to aircraft, its primary object being the provision of an aircraft which may be used both in flight and for use as a road vehicle, parts of the aircraft being foldable to reduce the size for storage in the usual garage or for parking.

One of my objects is the provision of an aircraft having rotatable blades or vanes in spider form and which may be folded into a common vertical plane.

Another my objects is the provision of an aircraft having supporting planes which are foldable against the fuselage about horizontal hinges.

Another of my objects is the provision of a tail assemblage having a rudder and having elevating planes hinged to the rudder, the whole tail assemblage having a telescoping relation with the body of the aircraft.

Another object which I have in view is the provision of supporting planes hingedly connected on longitudinal horizontal hinges to the aircraft body so as to be foldable in a vertical direction and having releasable braces which maintain the respective planes in operative position.

Another of my objects is the provision of a novel connection between the aircraft and the rotatable blades or vanes whereby the blades or vanes may be readily caused to assume their operative position or whereby they may be easily brought into their inoperative position in superposed relation to each other, a latch being also provided for maintaining the blades or vanes in their inoperative position.

Having in view these objects and others which will be pointed out in the following description, I will now refer to the drawings, in which Figure 1 is a view in perspective of my aircraft as it appears when ready for flight or in flight.

Figure 2 is another perspective view of my aircraft but showing the parts in folded or partly folded position.

Figure 3 is a view in side elevation of the gearing for driving the rotatable vanes or blades and showing also the clutch for holding the blades or vanes in their operative position.

Figure 4 is a plan view of the lowermost disc of the blades or vanes and showing also the worm gearing on the edge of that disc.

Figures 5 and 6 are plan views of the other two discs shown in my drawings and also showing together with Figure 4 the relative positions of the apertures in the three discs.

Figure 7 is a view in rear elevation and partly in section showing the positions of the three blades or vanes when folded and showing also the latch for holding the blades or vanes in inoperative position.

The aircraft is of the cabin type having a cabin 10 with suitable windows 11 and a door 12. The arrangement of these parts may, however, be varied as found desirable. The aircraft is also provided with a propeller 13, with a pair of supporting wings 14, and with a tail assemblage including a rudder 15 and a pair of horizontal elevating planes 16. Positively driven blades or vanes 17 are also provided, these blades or vanes being secured to rotate on and either with or independently of a vertical shaft 18. As thus far described the construction is well-known.

Each of the blades or vanes 17 is integral with a circular disc at the inner end of the shank of the blade or vane, these discs being individually shown in Figures 4, 5 and 6. The lowermost disc 19 is provided on its peripheral edge with a worm gearing which is driven by a worm 20 on the worm shaft 21. The disc 19 is provided with an aperture 22 for receiving a pin 23 as shown in Figure 3. This pin passes also through a bracket 24 and it is provided with a spring 26 which normally urges the pin 23 into its uppermost position. As shown in Figures 5 and 6, the intermediate disc 27 and the uppermost disc 28 are provided with apertures 29 and 30, the apertures 22, 29 and 30 being equidistant from each other when the blades or vanes 17 are in the folded position shown in Figure 2. The discs 27 and 28 are independently mounted on the shaft 18 and they are adapted to rotate thereon. When the blades or vanes 17 are in their operative position, the pin 23 is forced through the apertures 29 and 30 to latch all of the discs together for the equidistant spacing of the blades or vanes 17. If this pin is withdrawn from the apertures 29 and 30, the intermediate and upper blades or vanes may be swung around the shaft 18 so as to bring all three blades or vanes into vertical alignment with each other as shown in Figure 2. In this position of the blades or wings, the overall width of the aircraft is materially reduced.

I also provide a latch 31 for maintaining the blades or vanes 17 in their inoperative position. This latch is in the form of an inverted U which is integral with an arm projecting through the roof of the cabin 10 and which has both a rotatable and slidable relation with the roof. In the full line position of Figure 7, the latch 31 holds the blades or vanes 17 in their inoperative position. If it is desired to release this latch, the latch is first raised to the dotted line position of Figure 7 and it is then turned to clear the blades or vanes 17. It is then withdrawn into the cabin with a portion projecting out over the edge of the roof as shown in Figure 1. In this position of the latch 31, the blades or vanes 17 are free to assume their operative positions. This is accomplished by imparting rotation to the shaft 21 and through that shaft to the disc 19. The pin 23 normally bears against the intermediate disc and it will enter the aperture 29 as soon as the rotation of the disc 19 will bring it in alignment with that aperture. Likewise, a slight further rotation will bring the pin 23 into alignment with the aperture 30 so that all three blades or vanes 17 will be automatically latched in their operative position.

The overall width of the aircraft may be further reduced by the provision of folding supporting planes. The supporting planes 14 are each connected to the body of the aircraft by means of hinges 32. These hinges are at the lower edges of the body of the aircraft so that the planes 14 may be raised against the side walls of the body of the aircraft. Hinged braces 33 are employed for holding the planes 14 in rigid position during flight but the braces are provided with hinged connections which permit breaking in either direction. The folding of the planes 14 against the sides of the cabin will materially reduce the width of the aircraft and this folding together with the folding of the vanes or blades 17 will make it possible to use the aircraft as a road vehicle in relatively heavy traffic. The width of the aircraft when these parts are folded is no greater than the width of the average automobile.

The tail assemblage differs from the prior tail assemblages in two respects. The elevating planes 16 are secured through horizontal hinges 34 so that both planes 16 may be folded into upright position and in the plane of the direction of movement of the aircraft, braces 35 being employed for holding the elevating planes in operative position. This further reduces the overall width of the aircraft but it also makes possible the reduction in the overall length of the aircraft. As best shown in Figure 2, the tail assemblage has a telescoping relation with the body of the aircraft. When the aircraft is used as a road vehicle, the tail assemblage may be forced into the body of the aircraft where it is less liable to be struck by other vehicles on the road. Especially in parking, the length of the aircraft is ordinarily such that the tail is very susceptible to injury from passing traffic. When the parts are telescoped, however, the entire length of the aircraft is substantially that of an automobile.

From the foregoing description it will be seen that I have designed a vehicle which is adapted for use both on land and in the air. A farmer possessing such an aircraft is enabled to push the aircraft out of his garage, to unfold the various parts and to then take off from his farmyard. If he goes to the city, he lands at the outskirts of the city, folds up the various parts and then drives in through traffic and parks in the same manner as with an automobile. In returning to his farm, he first drives to the outskirts of the city and then flies to his farm where he may make a safe and easy landing in his farmyard. After he folds up the various parts he may store his aircraft in the place usually occupied by his automobile. Sportsmen from the city may do the same thing. They simply drive to the outskirts of the city and then take flight to the place where they desire to hunt or fish. For short stretches at the hunting or fishing grounds they drive the aircraft in the manner of an automobile but when a longer distance is to be covered, the parts are unfolded and the aircraft is flown to the desired spot.

In my drawings and description I attempt to disclose general principles rather than specific structures. The general object of the invention is the provision of an aircraft which is convertible into a road vehicle but the details may be varied within wide limits so long as the blades 17 are foldable into parallelism with the body of the aircraft and so long as the wings 14 and 16 are foldable and so long as the tail assembly telescopes into the body of the aircraft. The tripod support for the vanes 17 may be altered at will so long as it provides a substantial support for the vanes or wings 17 in both their operative and inoperative positions. The latch 31 is merely illustrative of one form of latch for holding the blades or vanes 17 in parallelism with each other. The nut or cap at the upper extremity of the shaft 18 may be of any suitable form but it must be strong enough to prevent the jumping of the disc 28 during the operation of the vanes 17. The latches 33 and 35 are obviously merely illustrative, the purpose being to show one form of latch for maintaining the planes 14 and 16 respectively in their operative positions. The supporting wheels may be either three in number as shown or they may be four in number if that arrangement is found preferable. Propulsion through the air is accomplished through the propeller 13 but it will be necessary to employ other propelling means when the vehicle is used for traveling on the road. As a land machine in traveling over smooth fields, the propeller 13 may furnish the motive power but in congested traffic it will probably be necessary to employ means which give a more sensitive control over the movements of the vehicle.

Having thus described my invention in such full, clear, and exact terms that its construction and operation will be readily understood by others skilled in the art to which it pertains, what I claim as new and desire to secure by Letters Patent of the United States is:

1. Aircraft having a fuselage comprising a fore part and a rear part in telescoping relation, and a rudder member having a fin projecting upwardly from said rear fuselage part, the upper wall of said fore fuselage part being provided with a slot for receiving the upwardly projecting fin of said rudder member when said fuselage parts are in telescoping relation.

2. Aircraft having a fuselage comprising fore and rear parts in telescoping relation, an outwardly projecting fin on said rear fuselage part, said fin being slidable into said fore fuselage part to project upwardly therefrom, elevating planes and horizontal hinges securing said elevating planes to said rear fuselage part for upward movement of said elevating planes into vertical parallelism with each other and with said fin, and hinged braces for releasably holding said planes in operative position.

3. Aircraft having a fuselage comprising fore and rear telescoping members, a fin secured to said rear member to project both upwardly and rearwardly therefrom, said fin being in intimate contact throughout a horizontal lower edge and a vertical forward edge with said rear member, said forward member being provided with a slot for receiving said fin, and a pair of elevating planes hingedly secured to said rear member and to said fin for foldable movement into substantial parallelism with said fin.

4. Aircraft having a fuselage comprising a fore member and a rear member in telescoping relation, an upwardly projecting fin on said rear member, said fore member being provided in its rear edge with a slot for receiving said fin, a pair of stabilizing planes hingedly secured to said rear member, and break hinge struts secured at their extremities to said stabilizing planes and to said fin.

CLYDE R. HARDING.